United States Patent Office 3,743,651
Patented July 3, 1973

---

3,743,651
N-(3,5 - DIHALOGENOPHENYL)-OXAZOLIDINE COMPOUNDS AND PREPARATION THEREOF

Akira Fujinami, Ashiya-shi, Toshiaki Ozaki, Keiichiro Akiba, and Sigeo Yamamoto, Osaka-fu, Shigehiro Ooba and Katsutoshi Tanaka, Takarazuka-shi, Katsuji Nodera, Nishinomiya-shi, Tadashi Ooishi, Osaka-fu, and Nobuyuki Kameda, Takarazuka-shi, Japan, assignors to Sumitomo Chemical Co., Ltd., and Hokko Chemical Industry Co., Ltd.
No Drawing. Filed Jan. 6, 1970, Ser. No. 1,064
Claims priority, application Japan, Feb. 1, 1969, 44/7,452; Apr. 21, 1969, 44/31,144
Int. Cl. C07d 85/44
U.S. Cl. 260—307 C                         9 Claims

---

ABSTRACT OF THE DISCLOSURE

N-(3,5-dihalophenyl)-oxazolidine compounds of the formula:

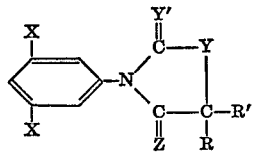

wherein R and R' are each hydrogen or lower alkyl, X is halogen, Y and Y' are each oxygen or sulfur and Z is oxygen or imino, provided that Z is imino when both of Y and Y' are oxygen and both of X are chlorine, useful as anti-microbial agents, which can be prepared by reacting a carbamic acid derivative of either one of the formulae:

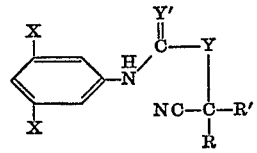

wherein R'' is hydrogen or lower alkyl and R, R', X, Y and Y' are each as defined above with a base or with a base and then an acid.

---

The present invention relates to novel N-(3,5-dihalophenyl)-oxazolidine compounds, and their production and use.

The said N-(3,5-dihalophenyl)-oxazolidine compounds are representable by the formula:

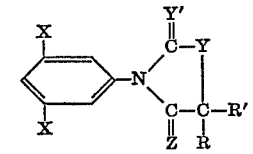

wherein R and R' are each hydrogen or lower alkyl (e.g. methyl, ethyl, propyl, isopropyl, butyl, isobutyl, t-butyl), X is halogen (e.g. fluorine, chlorine, bromine, iodine), Y and Y' are each oxygen or sulfur and Z is oxygen or imino, provided that Z is imino when both of Y and Y' are oxygen and both of X are chlorine.

Thus, the term "N - (3,5 - dihalophenyl)-oxazolidine compounds" herein used has a broad sense and covers at least the following seven kinds of compounds: i.e. 3-(3,5-dihalophenyl)-4-iminooxazolidin-2-one and its derivatives [I: Y=Y'=oxygen; Z=imino]; 3-(3,5-dihalophenyl)-4-oxooxazolidine - 2 - thione and its derivatives [I: Y=Z=oxygen; Y'=sulfur]; 3-(3,5-dihalophenyl)-4-iminooxazolidine-2-thione and its derivatives [I: Y=oxygen; Y'=sulfur; Z=imino]; 3 - (3,5 - dihalophenyl)-thiazolidine - 2,4 - dione and its derivatives [I: Y=sulfur; Y'=Z=oxygen]; 3 - (3,5 - dihalophenyl)-4-iminothiazolidin-2-one and its derivatives [I: Y=sulfur; Y'=oxygen; Z=imino]; 3 - (3,5-dihalophenyl)-4-oxothiazolidine-2-thione and its derivatives [I: Y=Y'=sulfur; Z=oxygen]; and 3 - (3,5-dihalophenyl) - 4 - iminothiazolidine-2-thione and its derivatives [I: Y=Y'=sulfur; Z=imino].

Specific examples of the compounds falling in the category of the N-(3,5-dihalophenyl)-oxazolidine compounds [I] are as follows:

3-(3,5-dihalophenyl)-4-iminooxazolidin-2-one (e.g. 3-(3,5-dichlorophenyl)-4-iminooxazolidin-2-one, 3-(3,5-dibromophenyl)-4-iminooxazolidin-2-one),
3-(3,5-dihalophenyl)-4-imino-5-lower alkyloxazolidin-2-one (e.g. 3-(3,5-dichlorophenyl)-4-imino-5-methyloxazolidin-2-one,
3-(3,5-dichlorophenyl)-4-imino-5-ethyloxazolidin-2-one,
3-(3,5-dibromophenyl)-4-imino-5-methyloxazolidin-2-one),
3-(3,5-dihalophenyl)-4-imino-5,5-di(lower)alkyloxazolidin-2-one (e.g. 3-(3,5-dichlorophenyl)-4-imino-5,5-dimethyloxazolidin-2-one,
3-(3,5-dichlorophenyl)-4-imino-5,5-diethyloxazolidin-2-one),
3-(3,5-dihalophenyl)-4-oxooxazolidine-2-thione (e.g. 3-(3,5-dichlorophenyl)-4-oxooxazolidine-2-thione,
3-(3,5-dibromophenyl)-4-oxooxazolidine-2-thione),
3-(3,5-dihalophenyl)-4-oxo-5-lower alkyloxazolidine-2-thione (e.g. 3-(3,5-dichlorophenyl)-4-oxo-5-methyloxazolidine-2-thione,
3-(3,5-dichlorophenyl)-4-oxo-5-ethyloxazolidine-2-thione),
3-(3,5-dihalophenyl)-4-oxo-5,5-di(lower)alkyloxazolidine-2-thione (e.g. 3-(3,5-dichlorophenyl)-4-oxo-5,5-dimethyloxazolidine-2-thione,
3-(3,5-dichlorophenyl)-4-oxo-5-methyl-5-ethyloxazolidine-2-thione),
3-(3,5-dihalophenyl)-4-iminooxazolidine-2-thione (e.g. 3-(3,5-dichlorophenyl)-4-iminooxazolidine-2-thione,
3-(3,5-dibromophenyl)-4-iminooxazolidine-2-thione),
3-(3,5-dihalophenyl)-4-imino-5-lower alkyloxazolidine-2-thione (e.g. 3-(3,5-dichlorophenyl)-4-imino-5-methyloxazolidine-2-thione,
3-(3,5-dichlorophenyl)-4-imino-5-ethyloxazolidine-2-thione),
3-(3,5-dihalophenyl)-4-imino-5,5-di(lower)alkyloxazolidine-2-thione (e.g. 3-(3,5-dichlorophenyl)-4-imino-5,5-dimethyloxazolidine-2-thione,
3-(3,5-dichlorophenyl)-4-imino-5,5-diethyloxazolidine-2-thione),
3-(3,5-dihalophenyl)-thiazolidine-2,4-dione (e.g. 3-(3,5-dichlorophenyl)-thiazolidine-2,4-dione, 3-(3,5-dibromophenyl)-thiazolidine-2,4-dione),
3-(3,5-dihalophenyl)-5-lower alkylthiazolidine-2,4-dione
  (e.g. 3-(3,5-dichlorophenyl)-5-methylthiazolidine-2,4-
  dione,
  3-(3,5-dichlorophenyl)-5-ethylthiazolidine-2,4-dione),
3-(3,5-dihalophenyl)-5,5-di(lower)alkylthiazolidine-2,4-
  dione (e.g. 3-(3,5-dichlorophenyl)-5,5-dimethyl-
  thiazolidine-2,4-dione,
  3-(3,5-dichlorophenyl)-5-methyl-5-ethylthiazolidine-2,4-
  dione),
3-(3,5-dihalophenyl)-4-iminothiazolidin-2-one (e.g.
  3-(3,5-dichlorophenyl)-4-iminothiazolidin-2-one,
3-(3,5-dibromophenyl)-4-iminothiazolidin-2-one),
3-(3,5-dihalophenyl)-4-imino-5-lower alkylthiazolidin-2-
  one (e.g. 3-(3,5-dichlorophenyl)-4-imino-5-methyl-
  thiazolidin-2-one,
  3-(3,5-dichlorophenyl)-4-imino-5-ethylthiazolidin-2-one),
3-(3,5-dihalophenyl)-4-imino-5,5-di(lower)alkylthiazoli-
  din-2-one (e.g. 3-(3,5-dichlorophenyl)-4-imino-5,5-
  dimethylthiazolidin-2-one,
  3-(3,5-dichlorophenyl)-4-imino-5,5-diethylthiazolidin-2-
  one),
3-(3,5-dihalophenyl)-4-oxothiazolidine-2-thione (e.g.
  3-(3,5-dichlorophenyl)-4-oxothiazolidine-2-thione,
  3-(3,5-dibromophenyl)-4-oxothiazolidine-2-thione),
3-(3,5-dihalophenyl)-4-oxo-5-lower alkylthiazolidine-2-
  thione (e.g. 3-(3,5-dichlorophenyl)-4-oxo-5-methyl-
  thiazolidine-2-thione,
  3-(3,5-dichlorophenyl)-4-oxo-5-ethylthiazolidine-2-
  thione,
3-(3,5-dihalophenyl)-4-oxo-5,5-di(lower)alkylthiazoli-
  dine-2-thione (e.g. 3-(3,5-dichlorophenyl)-4-oxo-5,5-
  dimethylthiazolidine-2-thione,
  3-(3,5-dichlorophenyl)-4-oxo-5,5-diethylthiazolidine-2-
  thione),
3-(3,5-dihalophenyl)-4-iminothiazolidine-2-thione (e.g.
  3-(3,5-dichlorophenyl)-4-iminothiazolidine-2-thione,
3-(3,5-dibromophenyl)-4-iminothiazolidine-2-thione),
3-(3,5-dihalophenyl)-4-imino-5-lower alkylthiazolidine-
  2-thione (e.g. 3-(3,5-dichlorophenyl)-4-imino-5-
  methylthiazolidine-2-thione,
  3-(3,5-dichlorophenyl)-4-imino-5-ethylthiazolidine-2-
  thione),
3-(3,5-dihalophenyl)-4-imino-5,5-di(lower)alkylthiazoli-
  dine-2-thione (e.g. 3-(3,5-dichlorophenyl)-4-imino-
  5,5-dimethylthiazolidine-2-thione,
  3-(3,5-dichlorophenyl)-4-imino-5,5-diethylthiazolidine-
  2-thione),
3-(3,5-dibromophenyl)-5,5-dimethyloxazolidine-2,4-
  dione,
3-(3,5-diiodophenyl)-5,5-dimethyloxazolidine-2,4-dione,
3-(3,5-difluorophenyl)-5-methyloxazolidine-2,4-dione, etc.

It has now been found that the said N-(3,5-dihalo-phenyl)-oxazolidine compounds [I] exhibit a strong anti-microbial activity against a wide variety of microorganisms including phytopathogenic fungi and parasites of industrial products. This finding is of unexpected and surprising property, because their analogous compounds such as the corresponding 3,5-unhalogenated derivatives show no appreciable anti-microbial activity. In this connection, it may be noted that some of their analogous compounds exert a strong herbicidal activity, whereas they do not have any herbicial action.

A basic object of the present invention is to embody the novel N-(3,5-dihalophenyl)-oxazolidine compounds [I]. Another object of this invention is to embody the N-(3,5-dihalophenyl)-oxazolidine compounds [I] having a marked anti-microbial activity. A further object of the invention is to embody a process for preparing the N-(3,5-dihalophenyl)-oxazolidine compounds [I]. These and other objects will be apparent to those conversant with the art to which the present invention pertains from the subsequent descriptions.

According to the present invention, the N-(3,5-dihalo-phenyl)-oxazolidine compounds [I] wherein Z is imino are prepared by treating a carbamic acid derivative of the formula:

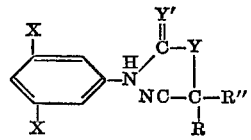

[II]

wherein R, R', X, X', Y and Y' are each as defined above with a base. Examples of the base are ammonia, organic amines (e.g. methylamine, ethylamine, dimethylamine, triethylamine, pyridine, N,N-dimethylaniline, N,N-diethylaniline), alkali metal alkoxides (e.g. sodium methoxide, sodium ethoxide), alkali metal carbonates (e.g. sodium carbonate), alkali metal bicarbonates (e.g. sodium bicarbonate), etc. The amount of the base is within the range from a catalytic amount to an amount employed as reaction medium. The use of a solvent is not necessarily required. When used, there may be employed, for example, benzene, toluene, xylene, chlorobenzene, dichlorobenzene, nirtobenzene, methanol, ethanol, etc. This reaction requires a temperature from a room temperature to about 200° C., and the treatment is normally accomplished while heating.

The N-(3,5-dihalophenyl)-oxazolidine compounds [I] wherein Z is oxygen are prepared by treating a carbamic acid derivative of the formula:

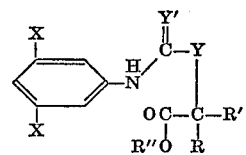

[III]

wherein R'' is hydrogen or lower alkyl (e.g. methyl, ethyl, propyl) and R, R', X, Y and Y' are each as defined above with a base. As the base, there may be used, for example, ammonia, organic amines (e.g. methylamine, ethylamine, dimethylamine, triethylamine, pyridine, N,N-dimethylaniline, N,N-diethylaniline), alkali metal alkoxides (e.g. sodium methoxide, sodium ethoxide), alkali metal carbonates (e.g. sodium carbonate), alkali metal bicarbonates (e.g. sodium bicarbonate) or the like. The amount of the base is from a catalytic amount to an amount used as reaction medium. The use of a solvent is not necessarily required. When used, there may be employed, for example, benzene, toluene, xylene, chlorobenzene, dichlorobenzene, nitrobenzene, etc. The reaction requires a temperature from about 50 to 200° C., and the treatment is ordinarily accomplished while heating.

Alternatively, the N-(3,5-dihalophenyl)-oxazolidine compounds [I] wherein Z is oxygen may be prepared by treating the corresponding 4-imino compound with an acid. The acid is used in at least an equimolar amount to the 4-imino compound. Examples of the acid are hydrochloric acid, hydrobromic acid, sulfuric acid, nitric acid, acetic acid, etc. The treatment is usually effected at room temperature or while heating below about 200° C., if necessary, in water or an organic solvent (e.g. benzene, toluene, xylene, chlorobenzene, isopropyl ether).

Alternatively, the N-(3,5-dihalophenyl)-oxazolidine compounds [I] wherein Z is oxygen may be also prepared by treating the carbamic acid derivative [II] with a base and then with an acid, isolating or not the intermediarily produced N-(3,5-dihalophenyl)-oxazolidine compound [I] wherein Z is imino. The treatments with the base and with the acid may be carried out in the same manner as above.

The starting materials in the above process, i.e. the carbamic acid derivatives [II] and [III] can be produced by various methods, some of which are shown in the following formulae:

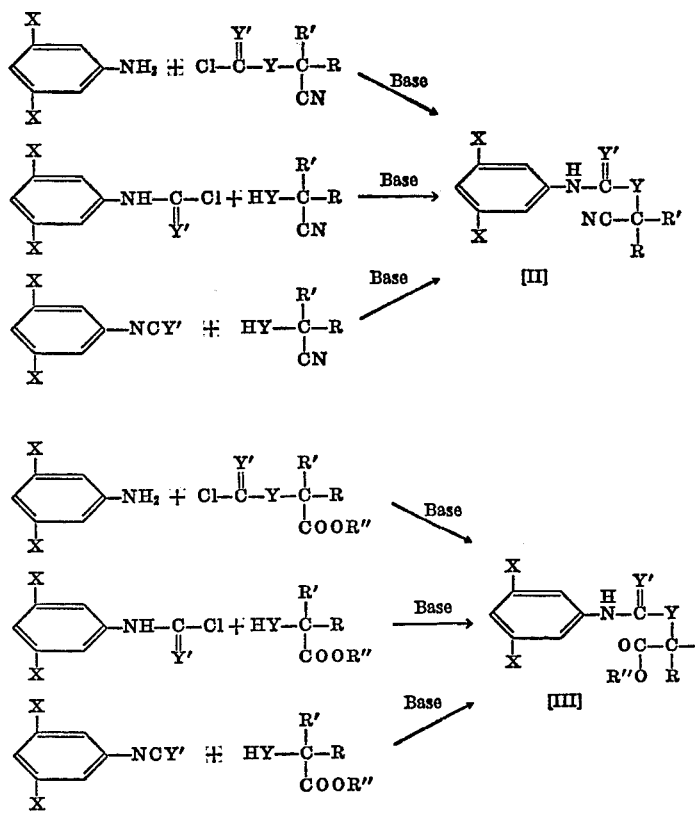

wherein R, R', R'', X, Y and Y' are each as defined above.

As stated above, the N-(3,5-dihalophenyl)oxazolidine compounds [I] of the present invention exert a strong antimicrobial activity against various microorganisms including phytopathogenic fungi (e.g. *Pyricularia oryzae, Cochliobolus miyabeanus, Xanthomonas oryzae, Sphaerotheca fuliginea, Pellicularia sasakii, Pellicularia filamentosa, Fusarium oxysporum, Corticium rolfsii, Botrytis cinerea, Sclerotinia sclerotiorum, Alternaria kikuchiana, Alternaria mali, Glomerella cingulata, Pythium aphanidermatum*) and parasites of industrial products (e.g. *Aspergillus niger*).

For instance, 3 - (3,5-dichlorophenyl)-thiazolidine-2,4-dione gives the following anti-microbial spectrum when determined by the agar dilution method:

| Test organism: | Minimal inhibitory concentration (p.p.m.) |
|---|---|
| *Pyricularia oryzae* | 200 |
| *Pellicularia sasakii* | 40 |
| *Cochliobolus miyabeanus* | 200 |
| *Pellicularia filamentosa* | 8 |
| *Botrytis cinerea* | 8 |
| *Sclerotinia sclerotiorum* | 8 |
| *Alternaria kikuchiana* | 40 |
| *Glomerella cingulata* | 200 |
| *Xanthomonas citri* | 200 |

Some of the test results which also support the antimicrobial activity of the N-(3,5-dihalophenyl)-oxazolidine compounds [I] are shown below.

TEST 1

The test compound in wettable powder form was diluted with water to make a 500 or 1,000 p.p.m. concentration and applied to rice plants cultured in pots of 9 cm. in diameter and grown up to the three leaved stage at a rate of 7 ml. of the dilution per pot. After one day, the plants were sprayed to inoculate with a spore suspension of *Pyricularia oryzae* thereon. Five days thereafter, the number of diseased spots was counted. The results are shown in the following tables, from which it is seen that the N-(3,5-dihalophenyl)-oxazolidine compounds [I] have stronger anti-fungal activity than the analogous compounds such as the corresponding unsubstituted or monohalogenated compounds:

TABLE a

| Test compound | Concentration (p.p.m.) | Number of diseased spots per 10 leaves |
|---|---|---|
| 3-(3,5-dichlorophenyl)-4-imino-5,5-dimethyl-oxazolidin-2-one | 500 | 23 |
| 3-(3,5-dichlorophenyl)-4-iminooxazolidin-2-one | 500 | 17 |
| 3-(3,5-dibromophenyl)-5,5-dimethyloxazolidine-2,4-dione | 500 | 19 |
| 3-(4-chlorophenyl)-4-imino-5-ethyloxazolidin-2-one | 500 | 158 |
| 3-(2-chlorophenyl)-4-imino-5,5-dimethyloxazolidin-2-one | 500 | 101 |
| Untreated | | 186 |

TABLE b

| Test compound | Concentration (p.p.m.) | Number of diseased spots per 10 leaves |
|---|---|---|
| 3-(3,5-dichlorophenyl)-thiazolidine-2,4-dione | 1,000 | 24 |
| 3-(3,5-dichlorophenyl)-4-oxothiazolidine-2-thione | 1,000 | 52 |
| 3-(3,5-dibromophenyl)-5,5-dimethyloxazolidine-2,4-dione | 1,000 | 37 |
| 3-phenyl-4-oxothiazolidin-2-thione | 1,000 | 386 |
| Untreated | | 426 |

TEST 2

The test compound in dust form was applied to rice plants cultured in pots of 9 cm. in diameter and grown up to the four leaved stage at a rate of 100 mg. of the dust per pot by the use of a duster. After one day, the plants were sprayed to inoculate with a spore suspension of *Cochliobolus miyabeanus* thereon. Three days thereafter, the number of diseased spots was counted. The results are shown in the following tables, from which it is seen that the N-(3,5-dihalophenyl)-oxazolidine compounds [I] have stronger anti-fungal activity than the analogous compounds such as the corresponding unsubstituted, monohalogenated or dihalogenated (but at the different positions) compounds:

TABLE a

| Test compound | Concentration (percent) | Number of diseased spots per leaf |
|---|---|---|
| 3-(3,5-dichlorophenyl)-4-imino-5,5-dimethyloxazolindin-2-one | 3.0 | 3 |
| 3-(3,5-dichlorophenyl)-4-imino-5-methyloxazolidin-2-one | 3.0 | 5 |
| 3-(3,5-dichlorophenyl)-4-iminooxazolidin-2-one | 3.0 | 0 |
| 3-(3,5-dibromophenyl)-4-imino-5,5-dimethyloxazolidin-2-one | 3.0 | 8 |
| 3-(3,5-difluorophenyl)-5-methyloxazolidine-2,4-dione | 3.0 | 3 |
| 3-(3-chlorophenyl)-4-iminooxazolidin-2-one | 3.0 | 83 |
| 3-(4-chlorophenyl)-4-imino-5-ethyloxazolidin-2-one | 3.0 | 70 |
| 3-(2-chlorophenyl)-4-imino-5,5-dimethyloxazolidin-2-one | 3.0 | 85 |
| 3-(3,4-dichlorophenyl)-4-imino-5,5-dimethyloxazolidin-2-one | 3.0 | 78 |
| Untreated | | 76 |

TABLE b

| Test compound | Concentration (percent) | Number of diseased spots per leaf |
|---|---|---|
| 3-(3,5-dichlorophenyl)-thiazolidine-2,4-dione | 2.0 | 0 |
| 3-(3,5-dichlorophenyl)-4-oxothiazolidine-2-thione | 2.0 | 0 |
| 3-(3,5-dichlorophenyl)-4-oxo-5-methylthiazolidine-2-thione | 2.0 | 1.1 |
| 3-(3,5-dichlorophenyl)-4-oxooxazolidine-2-thione | 2.0 | 0.9 |
| 3-(3-chlorophenyl)-thiazolidine-2,4-dione | 2.0 | 45.9 |
| 3-(2,5-dichlorophenyl)-4-oxooxazolidine-2-thioe | 2.0 | 49.0 |
| 3-phenyl-4-oxooxazolidine-2-thione | 2.0 | 56.3 |
| Untreated | | 4.85 |

TEST 3

A test compound in emulsion form was diluted with water to make a 200 or 500 p.p.m. concentration and applied to rice plants grown up to 50 to 60 cm. tall in pots of 9 cm. in diameter at a dose of 10 ml. of the dilution per pot. After three hours, a mycelium-disc-inoculum of *Pellicularia sasakii* was inoculated on the sheath. The infectious state at the sheath was observed 5 days thereafter, and the degree of damage was calculated according to the following equation:

$$\text{Degree of damage} = \frac{\Sigma \left(\text{Infection index} \times \text{Number of stems}\right)}{\text{Total number of stems} \times 3} \times 100$$

wherein the infection index was determined on the following criteria:

Infection index:    Infectious state
- 0 — No infectious spots on sheath.
- 1 — Infectious spot-like parts.
- 2 — Infectious spots of less than 3 cm. in size.
- 3 — Infectious spots of not less than 3 cm. in size.

The results are shown in the following tables, from which it is seen that the N-(3,5-dihalophenyl)oxazolidine compounds [I] have stronger anti-fungal activity than the analogous compounds such as the corresponding unsubstituted, monohalogenated or dihalogenated (but at the different positions) compounds:

TABLE a

| Test compound | Concentration (p.p.m.) | Degree of damage |
|---|---|---|
| 3-(3,5-dichlorophenyl)-4-imino-5,5-dimethyloxazolidin-2-one | 200 | 3.4 |
| 3-(3,5-dichlorophenyl)-4-imino-5-methyloxazolidin-2-one | 200 | 7.2 |
| 3-(3,5-dichlorophenyl)-4-iminooxazolidin-2-one | 200 | 0 |
| 3-(3,5-dibromophenyl)-4-imino-5,5-dimethyloxazolidin-2-one | 200 | 10.1 |
| 3-(3-chlorophenyl)-4-iminooxazolidin-2-one | 200 | 100 |
| 3-(4-chlorophenyl)-4-imino-5-ethyloxazolidin-2-one | 200 | 100 |
| 3-(2-chlorophenyl)-4-imino-5,5-dimethyloxazolidin-2-one | 200 | 100 |
| 3-(3,4-dichlorophenyl)-4-imino-5,5-dimethyloxazolidin-2-one | 200 | 100 |
| Untreated | | 100 |

TABLE b

| Test compound | Concentration (p.p.m.) | Degree of damage |
|---|---|---|
| 3-(3,5-dichlorophenyl)-thiazolidine-2,4-dione | 500 | 0 |
| 3-(3,5-dichlorophenyl)-4-oxothiazolidine-2-thione | 500 | 3.5 |
| 3-(3-chlorophenyl)-thiazolidine-2,4-dione | 500 | 100 |
| 3-(2,5-dichlorophenyl)-4-oxothiazolidine-2-thione | 500 | 100 |
| 3-phenyl-4-oxooxazolidine-2-thione | 500 | 100 |
| Untreated | | 100 |

TEST 4

The test compound in wettable powder form was diluted with water to make a 1000 p.p.m. concentration and applied to pumpkin seedlings cultured in pots of 12 cm. in diameter and grown up to the three to four leaved stage at a rate of 7 ml. of the dilution per pot. After one day, the plants were sprayed to inoculate with a spore suspension of *Sphaerotheca fuliginea* thereon. Ten days thereafter, the infections state was observed on the upper four leaves, and the degree of damage was calculated from the infectious area according to the following equation:

Degree of damage $$= \frac{\Sigma \left(\text{Infection index} \times \text{Number of leaves}\right)}{\text{Total number of leaves} \times 5} \times 100$$

wherein the infection index was determined on the following criteria:

Infection index:    Infectious area
- 0 — None
- 1 — Small
- 3 — Medium
- 5 — Large The results are shown in the following tables, from which it is seen that the N-(3,5-dihalophenyl)oxazolidine compounds [I] having strong anti-fungal actiivty than the analogous compounds such as the unhalogenated, monohalogenated or dihalogenated (but at the different positions) compounds:

TABLE a

| Test compound | Concentration (p.p.m.) | Degree of damage |
|---|---|---|
| 3-(3,5-dichlorophenyl)-4-imino-5,5-dimethyloxazolidin-2-one | 1,000 | 2.3 |
| 3-(3,5-dichlorophenyl)-4-iminooxazolidin-2-one | 1,000 | 3.5 |
| 3-(3-chlorophenyl)-4-iminooxazolidin-2-one | 1,000 | 59.6 |
| 3-(3,4-dichlorophenyl)-4-imino-5,5-dimethyloxazolidin-2-one | 1,000 | 37.4 |
| Untreated | | 63.8 |

TABLE b

| Test compound | Concentration (p.p.m.) | Degree of damage |
|---|---|---|
| 3-(3,5-dichlorophenyl)-thiazolidine-2,4-dione | 1,000 | 16.7 |
| 3-phenyl-4-oxooxazolidine-2-thione | 1,000 | 50.1 |
| Untreated | | 53.8 |

TEST 5

In each pot of 9 cm. in diameter, there was charged field soil, and soil (10 ml.) infected with *Pellicularia filamentosa* was dispersed over the surface. The test compound in emulsifiable concentrate form was diluted with water to make a 500 p.p.m. concentration, and the dilution was poured into the said pot at a rate of 15 ml. per pot. After two hours, 10 seeds of cucumber were sowed therein. Five days thereafter, the infectious state of the grown seedlings was observed, and the percentage of stand was calculated according to the following equation:

Percentage of stand $$= \frac{\text{Number of healthy seedlings in treated plot}}{\text{Number of germination in untreated plot}} \times 100$$

The results are shown in the following table, from which it is seen that the N-(3,5-dihalophenyl)-oxazolidine compounds [I] have stronger anti-fungal activity than the analogous compounds such as the unhalogenated, monohalogenated or dihalogenated (but at the different positions) compounds:

TABLE

| Test compound | Concentration (p.p.m.) | Percentage of stand |
|---|---|---|
| 3-(3,5-dichlorphenyl)-4-imino-5,5-dimethyl-oxazolidin-2-one | 500 | 96.5 |
| 3-(3,5-dichlorophenyl)-4-imino-5-methyl oxazolidin-2-one | 500 | 97.8 |
| 3-(3,5-dichlorophenyl)-4-iminooxazolidin-2-one | 500 | 100 |
| 3-(3,5-dibromophenyl)-4-imino-5,5-dimethyl-oxazolidin-2-one | 500 | 98.6 |
| 3-(3,5-dibromophenyl)-5,5-dimethyl-oxazolidine-2,4-dione | 500 | 93.4 |
| 3-(3,5-dichlorophenyl)-thiazolidine-2,4-dione | 500 | 90.2 |
| 3-(3,5-dichlorophenyl)-4-oxothiazolidine-2-thione | 500 | 89.5 |
| 3-(3,5-dichlorophenyl)-4-oxo-5-methylthiazolidine-2-thione | 500 | 90.0 |
| 3-(3,5-dichlorophenyl)-4-oxooxazolidine-2-thione | 500 | 83.2 |
| 3-(4-chlorophenyl)-4-imino-5-ethyloxazolidin-2-one | 500 | 15.2 |
| 3-(2-chlorophenyl)-4-imino-5,5-dimethyloxazolidin-2-one | 500 | 0 |
| 3-(3-chlorophenyl)-thiazolidine-2,4-dione | 500 | 9.8 |
| Pentachloronitrobenzene | 500 | 85.6 |
| Untreated, inoculated | | 0 |
| Untreated, not inoculated | | 100 |

TEST 6

When determined according to the agar dilution method, 3-(3,5-dichlorophenyl)-4-oxothiazolidine-2-thione and 3-(3,5-dichlorophenyl) - 4 - oxo - 5 - methylthiazolidine-2-thione afforded a minimal inhibitory concentration of 2,000 p.p.m. against *Aspergillus niger* ATCC No. 9642 which causes serious damage to industrial products.

As clearly understood from the above descriptions, the N-(3,5-dihalophenyl)-oxazolidine compounds [I] are useful as anti-microbial agents, particularly agricultural fungicides ad industrial fungicides. In other words, they may be used as agricultural chemicals for prevention or inhibition of plant diseases caused by phyto-pathogenic fungi and bacteria. They may be also used as industrial chemicals for prevention or inhibition of staining on industrial products.

For the said use, the N-(3,5-dihalophenyl)-oxazolidine compounds [I] may be employed as such but, in most practical cases, are extended with a suitable carrier(s) to make a conventional preparation form such as dust, wettable powder, oil spray, aerosol, tablet, emulsifiable concentrate, pellet or granule. Besides the N-(3,5-dihalophenyl)-oxazolidine compounds [I], these anti-microbial compositions may contain one or more known fungicides (e.g.:

Blasticidin S,
Kasugamycin,
Polyoxin,
Cellocidin,
Chloramphenicol,
O,O-diethyl-S-benzylphosphorothiolate,
O-ethyl-S,S-diphenylphosphorodithiolate,
O-n-butyl-S-ethyl-S-benzylphosphorodithiolate,
O,O-diisopropyl-S-benzylphosphorothiolate,
O-ethyl-S-benzylphenylthiophosphonate,
pentachlorobenzaldoxime,
pentachlorobenzyl alcohol,
pentachloromandelonitrile,
pentachlorophenyl acetate,
iron methylarsonate,
ferric ammonium methyl arsonate,
γ-1,2,3,4,5,6-hexachlorocyclohexane,
1,1,1-trichloro-2,2-bis(p-chlorophenyl)-ethane,
O,O-dimethyl-O-(p-nitrophenyl)phosphorothioate,
S-[1,2-bis(ethoxy carbonyl)ethyl]-O,O-dimethyl phosphorodithioate,
O,O-dimethyl S-(N-methylcarbamoylmethyl) phosphorodithioate,
O-ethyl O-p-nitrophenyl phenylphosphonothioate,
α-naphthyl N-methyl carbamate,
O,O-dimethyl-O-(p-nitro-m-methylphenyl)phosphorothioate,
3,4,5,6-tetrahydrophthalimidemethyl chrysanthemate,
3,4-dimethyl phenyl N-methylcarbamate,
O,O-diethyl O-(2-isopropyl-6-methyl-4-pyrimidinyl)thiophosphate,
O,O-dimethyl-2,2-dichlorovinyl phosphate,
1,1-bis(p-chlorophenyl)-2,2,2-trichlorethanol,
1,2-dibromoethane,
1,2-dibromo-3-chloropropane,
zinc ethylene bis(dithiocarbamate),
manganese ethylene bis(dithiocarbamate),
2,3-dichloro-1,4-naphthoquinone,
N-(trichloromethylthio)-4-cyclohexene-1,2-dicarboximide,
N-(1,1,2,2-tetrachloroethylthio)-4-cyclohexene-1,2-dicarboximide,
6-methyl-2,3-quinoxaline dithiol cyclic carbonate,
tetrachloroisophthalonitrile,
sodium p-dimethylaminobenzenediazosulfonate,
2,4-dichloro-6-(2-chloroanilino)-s-triazine,
2,4-dichlorophenoxyacetic acid,
4-chloro-2-methylphenoxyacetic acid,
3,4-dichloropropionanilide,
2,4-dichlorophenyl-4'-nitrophenyl ether,
2-chloro-4,6-bis(ethylamino)-s-triazine,
sodium N-(1-naphthyl)phthalamate, etc.).

The microbial compositions may also contain one or more materials known to be active as insecticides, nematocides, acaricides, herbicides, fertilizers, soil conditioners, soil disinfectants or plant growth regulators. Examples of typical microbial compositions according to this invention are:

(a) Dusts obtained by dispersing at least one of the N-(3,5-dichlorophenyl)-oxazolidine compounds [I] as the active ingredient in a concentration of 0.1 to 50% by weight in an inert carrier (e.g. talc, diatomaceous earth, wood flour, clay).

(b) Wettable powders obtained by dispersing at least one of the N-(3,5-dichlorophenyl)-oxazolidine compounds [I] as the active ingredient in a concentration of 0.1 to 80% by weight in an inert adsorbent carrier (e.g. diatomaceous earth) together with a wetting and/or dispersing agent such as an alkali metal salt of a long aliphatic sulfate chain, a partly neutralized sulfuric acid derivative of either petroleum oil or a natural occurring glyceride or a condensation product of an alkylene oxide with an organic acid.

(c) Emulsifiable concentrates obtained by dispersing at least one of the N-(3,5-dichlorophenyl)-oxazolidine compounds [I] as the active ingredient in a concentration of 0.1 to 50% by weight in an organic solvent (e.g. dimethylsulfoxide) plus an emulsifier such as an alkali metal salt of a long aliphatic sulfate chain, a partly neutralized sulfuric acid derivative of either a petroleum oil or a natural occurring glyceride or a condensation product of an alkylene oxide with an organic acid.

(d) Composition of the N-(3,5-dichlorophenyl)-oxazolidine compounds [I] formulated in the manner commonly employed in the art for the preparation of microbicidal granules, dusts and aerosols.

Practical and presently-preferred embodiments of the present invention are illustratively shown in the following examples. In these examples, parts and percent are by weight.

Example 1

Preparation of the N-(3,5-dihalophenyl)-oxazolidine compounds [I: Z=imino]: The carbamic acid derivative [II] (0.1 mol) and diethylaniline (0.0001 mol) are dissolved in toluene (50 g.), and the resultant solution is heated with reflux under stirring for 2 hours. The reaction mixture is concentrated under reduced pressure to give the objective N-(3,5-dihalophenyl)-oxazolidine compound.

Some of the N-(3,5-dihalophenyl)-oxazolidine compounds [I] obtained by the above procedure are shown in the following Table A:

dichlorophenyl)-4-oxooxazolidine-2-thione (23.9 g.) as white crystals melting at 173 to 176° C. Yield 92%.

*Elementary analysis.*—Calcd. (percent): C, 41,24; H, 1.91; N, 5.34; Cl. 27.05. Found (percent): C, 41.42; H, 1.87; N, 5.26; Cl, 26.84.

Example 4

Preparation of 3-(3,5-dibromophenyl)-5,5-dimethyloxazolidine-2,4-dione: As in Example 3, 3-(3,5-dibromophenyl)-4-imino-5,5-dimethyloxazolidin-2-one is treated with hydrochloric acid to give 3-(3,5-dibromophenyl)-5,5-dimethyloxazolidine-2,4-dione as crystals melting at 169.5 to 172° C. Yield, 95%.

*Elementary analysis.*—Calcd. (percent): C, 36.39; H, 2.50; N, 3.86; Br, 44.03. Found (percent): C, 36.31; H, 2.45; N, 3.78; Br. 44.26.

Example 5

Preparation of 3-(3,5-diiodophenyl)-5,5-dimethyloxazolidine-2,4-dione: As in Example 3, 3-(3,5-diiodophenyl)-4-imino-5,5-dimethyloxazolidine-2,4-dione is treated with hydrochloric acid to give 3-(3,5-diiodophenyl)-5,5-

TABLE A

| Starting carbamic acid derivative | Produced N-(3,5-dihalophenyl)-oxazolidine compound | M.P. (° C.) | Yield (%) | Calculated C | H | N | Cl or Br | Found C | H | N | Cl or Br |
|---|---|---|---|---|---|---|---|---|---|---|---|
| Cyanomethyl N-(3,5-dichlorophenyl)-carbamate. | 3-(3,5-dichlorophenyl)-4-imino-oxazolidin-2-one. | 120.5-121.5 | 98 | 44.11 | 2.47 | 11.43 | 28.94 | 44.03 | 2.61 | 11.17 | 28.61 |
| α-Cyanoethyl N-(3,5-dichlorophenyl)-carbamate. | 3-(3,5-dichlorophenyl)-4-imino-5-methyloxazolidin-2-one. | 101-103 | 98 | 46.67 | 3.19 | 11.11 | 26.96 | 46.36 | 3.11 | 10.81 | 27.37 |
| α-Cyanoisopropyl N-(3,5-dichlorophenyl)carbamate. | 3-(3,5-dichlorophenyl)-4-imino-5,5-dimethyloxazolidin-2-one. | 135-136.5 | 99 | 48.33 | 3.69 | 10.26 | 25.96 | 48.36 | 3.64 | 10.34 | 26.00 |
| α-Cyanoisopropyl N-(3,5-dibromophenyl)carbamate. | 3-(3,5-dibromophenyl)-4-imino-5,5-dimethyloxazolidin-2-one. | 166-168 | 97 | 36.49 | 2.78 | 7.74 | 44.15 | 36.52 | 2.74 | 7.60 | 44.23 |

Example 2

Preparation of the N-(3,5-dihalophenyl)-oxazolidine compounds [I: Z=oxygen]: The carbamic acid derivative [III] (0.1 mol) is added to pyridine (1 g.), and the resultant mixture is heated at 100 to 160° C. under stirring for 3 hours. The crude product is recrystallized from ethanol to give the objective N-(3,5-dihalophenyl)oxazolidine compound.

Some of the N-(3,5-dihalophenyl)-oxazolidine compounds [I] obtained by the above procedure are shown in the following Table B:

dimethyloxazolidine-2,4-dione as crystals melting at 137 to 139° C. Yield, 81%.

*Elementary analysis.*—Calcd. (percent): C, 28.91; H, 1.99; N, 3.07; I, 55.54. Found (percent): C, 28.85; H, 1.90; N, 3.00; I, 55.35.

Example 6

Preparation of 3-(3,5-dichlorophenyl)-4-oxooxazolidine-2-thione: A solution of α-cyanomethyl N-(3,5-dichlorophenyl)-dithiocarbamate (27.7 g.; 0.1 mol) and N,N-diethylaniline (1.5 g.) in toluene (100 ml.) is stirred at 90 to 110° C. for 2 hours. The inner temperature is

TABLE B

| Starting carbamic acid derivative | Produced N-(3,5-dihalophenyl)-oxazolidine compound | M.P., (° C.) | Yield (percent) | Calculated C | H | N | Cl or Br | Found C | H | N | Cl or Br |
|---|---|---|---|---|---|---|---|---|---|---|---|
| S-ethoxycarbonylmethyl N-(3,5-dichlorophenyl)-thiocarbamate. | 3-(3,5-dichlorophenyl)-thiazolidine-2,4-dione. | 166-167 | 87 | 41.24 | 1.91 | 5.34 | 27.05 | 40.84 | 1.72 | 5.49 | 26.75 |
| Ethoxycarbonylmethyl N-(3,5-dichlorophenyl)dithiocarbamate. | 3-(3,5-dichlorophenyl)-4-oxothiazolidine-2-thione. | 185.5-187.5 | 91 | 38.86 | 1.81 | 5.04 | 25.49 | 38.58 | 1.89 | 4.96 | 25.60 |
| S-(α-Ethoxycarbonylethyl) N-(3,5-dichlorophenyl)dithiocarbamate. | 3-(3,5-dichlorophenyl)-4-oxo-5-methylthiazolidine-2-thione. | 139.5-140.5 | 82 | 41.10 | 2.41 | 4.79 | 24.27 | 41.13 | 2.47 | 4.65 | 24.43 |
| O-ethoxycarbonylmethyl N-(3,5-dichlorophenyl) thiocarbamate. | 3-(3,5-dichlorophenyl)-4-oxooxazolidine-2-thione. | 172-175 | 85 | 41.24 | 1.91 | 5.34 | 27.05 | 40.99 | 2.06 | 5.20 | 26.81 |
| 1-methyl-1-ethoxycarbonylethyl N-(3,5-dibromophenyl)carbamate. | 3-(3,5-dibromophenyl)-5,5-dimethyl-oxazolidine-2,4-dione. | 169.0-172.0 | 86 | 36.39 | 2.50 | 3.86 | 44.03 | 36.23 | 2.53 | 3.82 | 43.71 |

Example 3

Preparation of 3 - (3,5 - dichlorophenyl)-4-oxooxazolidine-2-thione: To a solution of 3-(3,5-dichlorophenyl)-4-iminooxazolidine-2-thione (26.1 g.; 0.1 mol) in toluene (100 ml.), 20% hydrochloric acid (35 g.) is dropwise added while stirring at 80 to 90° C., and then stirring is continued at the same temperature for 3 hours. After cooling, the reaction mixture is filtered. The collected material is washed with water and dried to give 3-(3,5- lowered to 85° C., and then 20% hydrochloric acid (35 g.) is dropwise added thereto while stirring. Stirring is continued at 80 to 90° C. for 3 hours. After cooling, the reaction mixture is filtered. The collected material is washed with water and dried to give 3-(3,5-dichlorophenyl)-4-oxooxazolidine-2-thione (23.5 g.) as white crystals melting at 186.0 to 187.0° C. Yield, 85%.

*Elementary analysis.*—Calcd. (percent): C, 38,86; H, 1.81; N, 5.04; Cl, 25.49. Found (percent): C, 38.73; H, 1.94; N, 4.99; Cl, 25.31.

Example 7

Preparation of dust: 3-(3,5-dichlorophenyl)-4-iminooxazolidin-2-one (3 parts) and clay (97 parts) are crushed and mixed well to make a dust containing 3% of the active ingredient. The dust is applicable as such.

Example 8

Preparation of dust: 3-(3,5-dichlorophenyl)-4-imino-5,5-dimethyloxazolidin-2-one (4 parts) and talc (96 parts) are crushed and mixed well to make a dust containing 4% of the active ingredient. The dust is applicable as such.

Example 9

Preparation of dust: 3-(3,5-dichlorophenyl)-thiazolidine-2,4-dione (3 parts) and clay (97 parts) are crushed and mixed well to make a dust containing 3% of the active ingredient. The dust is applicable as such.

Example 10

Preparation of dust: 3-(3,5-dichlorophenyl)-4-oxothiazolidine-2-thione (4 parts) and talc (96 parts) are crushed and mixed well to make a dust containing 4% of the active ingredient. The dust is applicable as such.

Example 11

Preparation of wettable powder: 3-(3,5-dichlorophenyl)-4-imino-5-methyloxazolidin-2-one (50 parts), a wettable agent (alkylbenzenesulfonate) (5 parts) and diatomaceous earth (45 parts) are crushed and mixed well to make a wettable powder containing 50% of the active ingredient. The wettable powder is diluted with water and then applied.

Example 12

Preparation of wettable powder: 3-(3,5-dichlorophenyl) - 4 - oxo - 5 - methylthiazolidine-2-thione (50 parts), a wettable agent (alkylbenzenesulfonate) (5 parts) and diatomaceous earth (45 parts) are crushed and mixed well to make a wettable powder containing 50% of the active ingredient. The wettable powder is diluted with water and then applied.

Example 13

Preparation of emulsifiable concentrate: 3-(3,5-dibromophenyl)-4-imino-5,5-dimethyloxazolidin - 2 - one (10 parts), dimethylsulfoxide (80 parts) and an emulsifier (polyoxyethylenephenylphenol ether) (10 parts) are mixed well to make an emulsifiable concentrate containing 10% of the active ingredient. The emulsifiable concentrate is diluted with water and then applied.

Example 14

Preparation of emulsifiable concentrate: 3-(3,5-dichlorophenyl) - 4 - oxooxazolidine - 2 - thione (10 parts), dimethylsulfoxide (80 parts) and an emulsifier (polyoxyethylenephenylphenol ether) (10 parts) are mixed well to make an emulsifiable concentrate containing 10% of the active ingredient. The emulsifiable concentrate is diluted with water and then applied.

Example 15

Preparation of granule: 3 - (3,5 - dichlorophenyl)-4-imino - 5,5 - dimethyloxazolidin - 2 - one (5 parts), clay (93.5 parts) and a binding agent (polyvinyl alcohol) (1.5 parts) are crushed and mixed well. The mixture is kneaded with water and granulated to make granules containing 5% of the active ingredient. The granules are applicable as such.

Example 16

Preparation of granule: 3-(3,5-dichlorophenyl)-thiazolidine-2,4-dione (5 parts), clay (93.5 parts) and a binding agent (polyvinyl alcohol) (1.5 parts) are crushed and mixed well. The mixture is kneaded with water and granulated to make granules containing 5% of the active ingredient. The granules are applicable as such.

Example 17

Preparation of complex dust: 3-(3,5-dichlorophenyl)-4 - imino - 5,5 - dimethyloxazolidin-2-one (2 parts), O-n-butyl-S-ethyl-S-benzylphosphorodithiolate (1.5 parts), Kasugamycin (0.1 part) and clay (96.4 parts) are crushed and mixed well to make a dust containing 3.6% of the active ingredients. The dust is applicable as such.

Example 18

Preparation of complex dust: 3 - (3,5-dichlorophenyl)-4 - imino - 5 - methyloxazolidin - 2 - one (2 parts), O-n-butyl - S - ethyl - S - benzylphosphorodithiolate (1.5 parts), O,O - dimethyl - O - (3 - methyl-4-nitrophenyl)-phosphorothioate (2 parts), 3,4 - dimethylphenyl - N-methylcarbamate (1.5 parts) and clay (93 parts) are crushed and mixed well to make a dust containing 7% of the active ingredients. The dust is applicable as such.

Example 19

Preparation of complex dust: 3-(3,5-dichlorophenyl)-thiazolidine - 2,4 - dione (2 parts), O-n-butyl-S-ethyl-S-benzylphosphorodithiolate (1.5 parts), Kasugamycin (0.1 part) and clay (96.4 parts) are crushed and mixed well to make a dust containing 3.6% of the active ingredients. The dust is applicable as such.

Example 20

Preparation of complex dust: 3 - (3,5 - dichlorophenyl)-thiazolidine - 2,4 - dione (2 parts), O-n-butyl-S-ethyl - S - benzylphosphorodithiolate (1.5 parts), O,O-dimethyl - O - (3 - methyl - 4 - nitrophenyl)phosphorothioate (2 parts), 3,4-dimethylphenyl-N-methylcarbamate (1.5 parts) and clay (93 parts) are crushed and mixed well to make a dust containing 7% of the active ingredients. The dust is applicable as such.

What is claimed is:

1. A 4-iminooxazolidine-2-one having the formula:

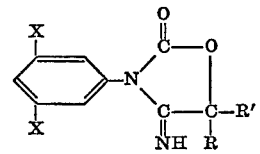

wherein R and R' are each hydrogen or methyl and X is chloro, bromo or iodo.

2. The compound according to claim 1 wherein said compound is 3 - (3,5-dichlorophenyl)-4-iminooxazolidin-2-one.

3. The compound according to claim 1, wherein said compound is 3 - (3,5-dichlorophenyl)-4-imino-5-methyloxazolidin-2-one.

4. The compound according to claim 1, wherein said compound is 3 - (3,5 - dibromophenyl) - 4 - imino - 5,5-dimethyloxazolidin-2-one.

5. The compound as claimed in claim 1 wherein X is chloro and R and R' are both hydrogen.

6. The compound as claimed in claim 1 wherein X is bromo and R and R' are both methyl.

7. The compound as claimed in claim 1 wherein X is chloro and R and R' are both methyl.

8. The compound as claimed in claim 1 wherein X is chloro and one of R and R' is methyl the other being hydrogen.

9. 3 - (3',5' - dichlorophenyl) - 4 - imino-5,5-dimethyl-oxazolidin-2-one.

References Cited
FOREIGN PATENTS 1,036,075    7/1966    Great Britain.
1,284,516    1/1962    France.

ALEX MAZEL, Primary Examiner

J. TOVAR, Assistant Examiner

U.S. Cl. X.R.

260—306.7; 424—270, 272